Sept. 5, 1961     L. W. WUSTERBARTH     2,999,226
HAND STEERING WHEEL POSITION INDICATOR
Filed Nov. 6, 1958
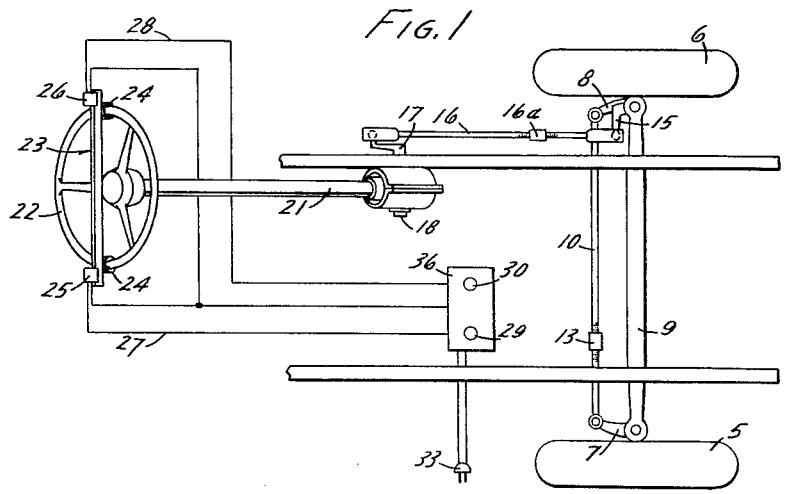
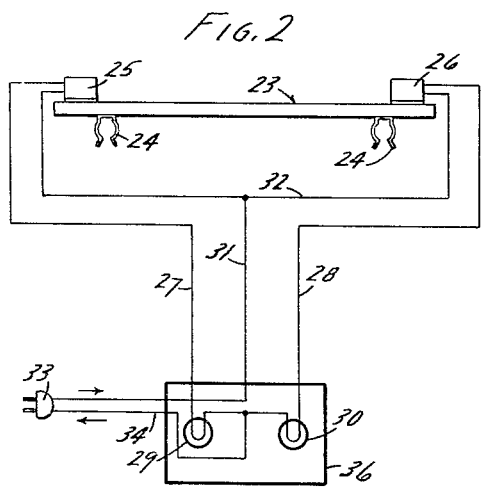
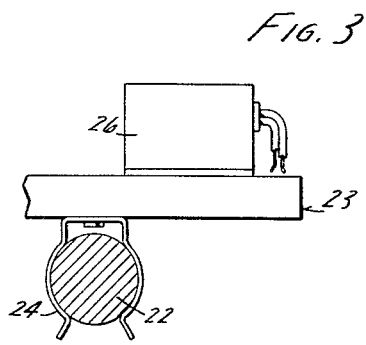
INVENTOR.
LYLE W. WUSTERBARTH
BY
Lieber, Lieber & Nilles
ATTORNEYS

United States Patent Office 2,999,226
Patented Sept. 5, 1961

2,999,226
HAND STEERING WHEEL POSITION INDICATOR
Lyle W. Wusterbarth, Rte. 1, Kiel, Wis., assignor of one-half to Leon W. Wusterbarth, Kiel, Wis.
Filed Nov. 6, 1958, Ser. No. 772,218
4 Claims. (Cl. 340—52)

This invention relates to a device for indicating when the hand steering wheel of a vehicle is in a predetermined position to thereby facilitate the alignment of the steerable ground wheels therewith.

It is usually desirable to have the hand steering wheel of a vehicle in a straight or unturned position when the steerable ground wheels are also straight for travel in a forward direction.

Misalignment of the steerable ground wheels with respect to the steering wheel, or of one steerable ground wheel with respect to the other, may result from any one of a number of improper conditions such as a bent tie rod or wheel spindle, steering worm gear misadjustment or improper tie rod adjustment. After the steerable ground wheels have been aligned with one another, it is desirable to then align these wheels with the hand steering wheel located in the vehicle, and it is this latter aligning problem with which the present invention is concerned.

To change the position of the steerable ground wheels with respect to the hand steering wheel, it is necessary to adjust the steering linkage underneath the vehicle. When performing this adjustment, it is impossible for the mechanic to clearly see if the hand steering wheel within the vehicle is in a straight or non-turned position at the same time that the ground wheels are aligned in a precise fore and aft direction. Therefore it is necessary for the mechanic to make several separate adjustments of the linkage, and between each adjustment, get out from under the vehicle, visually check the position of the hand steering wheel, and then again get under the vehicle to make a further adjustment. This entire "cut and try" process results in an adjustment which is not entirely accurate and wherein the amount of "play" in the steering carriage may not necessarily be equal on both sides of the steering wheel.

Accordingly, it is an object of the present invention to provide a hand steering wheel position indicator by means of which a mechanic, located where he cannot see said wheel, can nevertheless readily tell the direction in which the latter is moved from a straight position.

These and other objects and advantages will appear hereinafter, reference being had to the accompanying drawings, in which:

FIGURE 1 is a plan view of a steering mechanism for a vehicle showing the present invention as used therewith;

FIGURE 2 is a view of the position indicator made in accordance with the present invention; and FIGURE 3 is a view of one of the clamping brackets, on an enlarged scale.

Referring in greater detail to the drawings, the conventional steering carriage of the vehicle includes the steerable ground wheels 5 and 6 which are rotatably mounted on their knuckles 7 and 8, respectively, carried on the axle 9. A tie rod 10 is connected to the knuckles and has a threaded adjustment 13 by which the wheels 5 and 6 may be made parallel to one another.

The knuckle 8 has an integral arm 15 which is connected by a drag link 16, which is adjustable in length by the threaded adjustment 16a, to the crank arm 17 of the rock shaft 18. A pinion (not shown) is fixed to the rock shaft and is rotated by the worm (not shown) of steering post 21. The steering wheel 22 is fixed to the post 21 and is shown in its "straight" position which should normally indicate that the ground wheels 5 and 6 are also pointed in the straight ahead position.

In accordance with the present invention, a steering wheel position indicator is provided which includes an attaching member 23 having a spring-loaded clamp 24 at each end by which it is readily clamped to the wheel 22. Movement indicating means are mounted on this member 23 to indicate in which direction the wheel 22 is turned from the straight or unturned position as shown in the drawings. This indicating means may be of various movement-indicating types such as balance switches, but is shown here for illustrative purposes as mercury switches 25 and 26 located on opposite ends of member 23. These switches are either open or closed and are preferably closed to complete an electrical circuit therethrough when they are in the straight position (as shown) or when they are raised above this position by rotation of the wheel 23. However, when one of these switches is lowered from the position shown, as when the wheel is rotated slightly, it is opened, thereby opening the circuit therethrough.

Switches 25 and 26 are connected by their respective wires 27 and 28 to electric bulbs 29 and 30. These bulbs are preferably of different colors so as to give a clear and positive indication to the mechanic under the vehicle of which direction the wheel is turned from the straight position. Common wires 31 and 32 connect each of the switches to the plug 33 and wire 34 connects the plug to bulbs 29 and 30.

The bulbs 29 and 30 are suitably mounted in their sockets on a base or support member 36 which is adapted to be set on the ground in any position to be within view of the mechanic while he is under the vehicle making the necessary steering adjustment to the linkage. Wires 27, 28 and 31 are made sufficiently long for this purpose and the lights, because of their different colors, need not be oriented in respect to any particular side of the vehicle.

The electrical circuit is such that both lights are "on" when the wheel is centered, although, of course, both lights could be made to be "off" under this circumstance. By having both lights "on," however, a positive indication is given to the mechanic, whereas if the lights were "off" to indicate a wheel center position, a false signal would be given if the plug 33 was accidently disengaged from its socket (not shown).

As the bulbs are of different colors, for example, bulb 29 could be green and bulb 30 red, the operator can immediately tell which direction the wheel 22 is turned from straight, or if it is in the straight position.

In operation, the wheel 22 is "centered" or turned to a straight position in which both lights 29 and 30 are turned on. If the wheel 22 is turned slightly to the right (clockwise as viewed in FIGURE 1), the switch 25 is lowered and thereby opens the circuit through green light 29, turning it off. The switch 26 is raised slightly but remains closed, as does the circuit through the red light 30. The mechanic then immediately knows the wheel 22 is turned too far to the right and adjusts it accordingly to return it to straight.

When the mechanic is under the vehicle adjusting the linkage to align the wheels 5 and 6 in a fore and aft direction, he periodically looks at the lights to see if one goes "off," indicating that wheel 22 is turned from its predetermined centered position. After he completes the fore and aft alignment of wheels 5 and 6, if the lights are still on, he knows that the steering wheel 22 is in alignment with the steerable ground wheels.

By making the above alignment in which the wheel 22 is maintained stationary, a more accurate coordination between the ground wheels and steering wheel is possible, and any "play" in the system is equally divided on both sides of the centered steering wheel.

Various modes of carrying out the invention are contemplated as being within the scope of the following claims particularly pointing out and distinctly claiming the subject matter which is regarded as the invention.

I claim:

1. A hand steering wheel position indicator device for indicating alignment between a hand steering wheel and steerable ground wheels of an automobile, said device comprising, a pair of movement-sensitive electrical switches secured at spaced locations to an attaching bar, means on said bar for quick attachment to said hand steering wheel, a separate base member positionable on the ground and beneath said car, an electric light for each of said switches and mounted on said base member, and an electrical circuit so connecting said light and switches whereby the former cause the latter to indicate the direction in which said wheel is turned from a predetermined position.

2. Advice as defined in claim 1, further characterized in that when said wheel is in a predetermined position both lights are on, and when said wheel is turned in one direction or the other from said predetermined position one of said lights or the other, respectively, is cut out of the circuit by its respective switch.

3. A hand steering wheel position indicator device adapted to be removably attached to a stationary automobile and for indicating alignment between a hand steering wheel and steerable ground wheels of said automobile, said device comprising, a pair of movement-sensitive electrical switch means detachably securable to said steering wheel, a separate base member positionable on the ground and beneath said car, an electrical light for switch means and mounted on said base member, and an electrical circuit so connecting said light and switch means whereby the former causes the latter to indicate the direction in which said wheel is turned from a predetermined position.

4. A device as defined in claim 3, further characterized in that said lights are so wired in said circuit that when said wheel is in a predetermined position both lights are on and when said wheel is turned in one direction or the other from said predetermined position, one of said lights or the other, respectively, is cut out of said circuit by its respective switch.

References Cited in the file of this patent

UNITED STATES PATENTS

| | | |
|---|---|---|
| 672,851 | Spiller | Apr. 23, 1901 |
| 1,770,415 | Martin et al. | July 15, 1930 |
| 1,804,622 | Johnson | May 12, 1931 |
| 1,808,683 | Rooney | June 2, 1931 |
| 2,214,161 | Cater | Sept. 10, 1940 |
| 2,624,123 | Wilkerson | Jan. 6, 1953 |
| 2,888,668 | Colatriano | May 26, 1959 |